Figure 1:
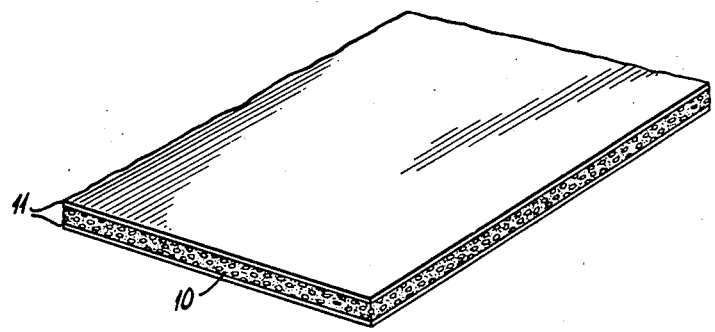

July 12, 1949.  B. E. GALLUP  2,475,781
METHOD OF MAKING CONSTRUCTION MATERIAL
Original Filed Nov. 15, 1943

Inventor

BRAXTON E. GALLUP

By

Attorney

Patented July 12, 1949

2,475,781

UNITED STATES PATENT OFFICE 2,475,781

METHOD OF MAKING CONSTRUCTION MATERIAL

Braxton E. Gallup, Bound Brook, N. J., assignor to The Ruberoid Co., New York, N. Y., a corporation of New Jersey Original application November 15, 1943, Serial No. 510,367. Divided and this application April 20, 1944, Serial No. 531,889

2 Claims. (Cl. 154—88)

This invention relates to a method of making a construction material, and is a division of my co-pending application Ser. No. 510,367, filed November 15, 1943, now abandoned. More particularly the invention is directed to a method of making a weatherproof laminated building board having a porous or cellular core containing a bituminous constituent and adhesively united to outer coverings or liners.

The board is especially adapted for use for exterior work subject to exposure to weathering. The prior art boards have been incapable of withstanding the effects of weather, and have been limited to use as wallboard for interior work.

The cores of the prior art boards have usually been made from a mixture of a filler and an alkaline silicate intumesced in a mold or confined between liners. Such cores are pervious to moisture and deteriorate on exposure to water.

I am aware that various proposals have been made to impart water resistance to the core, but none of these proposals has resulted in the production of a laminated board that is sufficiently waterproof and weatherproof to permit of satisfactory use for exterior construction purposes. Furthermore, in the laminated boards as heretofore made the adhesion between the core and the liners tends to become weakened on exposure to moisture with the result that the material will in time delaminate.

The principal objects of the present invention are to overcome the defects of the prior art boards by the manufacture of a laminated construction material that is highly resistant to the effects of weather and water, and in which the liners are strongly and autogenously adhered to the core.

Other objects of the invention are to make a weatherproof laminated board that is light in weight, rigid, and strong; that is substantially impervious to moisture; that is unaffected by changes in temperature or other climatic conditions; and that has high thermal insulation efficiency.

Specimens of the product have been subjected to immersion in water for considerable periods of time without delaminating or showing a tendency to delaminate. While by reason of its exceptional ability to withstand the effects of water and weather the board is particularly suited for outdoor use, it may also be employed for interior construction.

The product in its preferred embodiment comprises a cellular or porous core containing a bituminous constituent and adhesively united to felt liners saturated or impregnated with a bituminous composition.

According to my invention a bituminous substance, such as petroleum asphalt, or coal-tar pitch, is intimately incorporated in the core mixture. I have found that the addition of a minor percentage by weight of the bituminous substance produces a core of lighter weight, increased water resistance, and improved adhesion to the liners. It also effects the surprising and unexpected result of a more uniform distribution of the pores or voids throughout the intumesced core. While the explanation of this phenomenon has not been definitely determined, it is believed that the bituminous substance on fusing or softening increases the surface tension of the silicate and thus promotes a lighter and more evenly textured intumesced mass.

Figure 2:
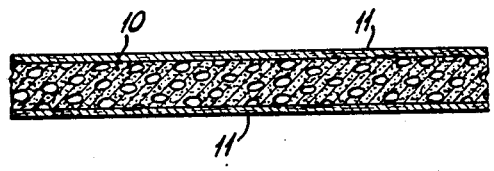

The invention is illustrated in the accompanying drawings, in which:

Figure 1 is a perspective view of a corner fragment of a laminated board embodying the invention; and, Fig. 2 is a vertical section of the board.

Having reference now to the drawings, the core is indicated by the character 10, and the liners by the character 11. The board is usually about ¼ inch thick, although thicker or thinner boards may be made.

In the practice of the invention I made the core 10 from a mixture of a filler, an alkali silicate, and a bituminous substance. The bituminous substance constitutes only a relatively small or minor proportion by weight of the whole mix.

The following represents a formula of a preferred core mix, it being understood, however, that this is given by way of illustration and not of limitation, since the percentages stated may be subject to variation:

| | Per cent by weight |
|---|---|
| Filler, limestone | 60.5 |
| Alkali silicate, sodium silicate | 33.3 |
| Bituminous substance, petroleum asphalt | 6.2 |

The filler is of such character that the mixture is rendered capable of being intumesced, in the presence of an alkali silicate, to form a porous or cellular mass. Limestone, marble dust, dolomite, and dolomitic limestone, ground or comminuted to a fineness that approximately 75% will pass through a 100 mesh screen, are suitable fillers. While use of inorganic mineral fillers is preferred, mixtures of such fillers with organic or inert substances may be used.

The alkali silicate, preferably sodium silicate, may have an alkali-silicate ratio of about 1 to 3.90 and a specific gravity of about 33.5° Baumé, although alkali silicates of other suitable ratios and specific gravities may be used. For example, one having a ratio of about 1 to 3.22 and a specific gravity of about 41.0° Baumé has been found to be satisfactory.

The bituminous substance is preferably petroleum asphalt having a softening or fusing point ranging from about 200° to 240° F. Other bituminous substances, for instance coal-tar pitch, of similar characteristics may be used.

The liners 11 may be made from sheets of felt, such as rag felt, waterproofed with a bituminous saturant. Both the felt and the saturant may be of the kind commonly used in the manufacture of roofing materials. The liners may also be made of chip board, kraft paper, asbestos, or other suitable fabric or fibrous material. Preferably the liners consist of felt saturated or impregnated with asphalt, but in some instances the liners may be used in a dry condition, that is, without being saturated or impregnated.

In the manufacture of the board, the bituminous substance together with a substantially equal amount by weight of the filler are ground to a fine powder in which the particles of both constituents are intimately mixed. This intimate mixture is then added to the remaining quantity of the filler and mixed with the sodium silicate to form a smooth, homogeneous mixture of paste-like consistency.

The paste-like mixture is applied or spread between the liners in a layer of substantially uniform thickness, and the composite structure is then heated in a platen press or other suitable apparatus to a temperature of about 300° F. The heating is continued for a sufficient length of time to cause the mixture to swell or intumesce in the form of a lightweight, porous core of low density and substantially uniform texture throughout. The liners are firmly and autogenously adhered to the core, that is to say, no extraneous adhesive or cement is used.

What I claim is:

1. The method of making a laminated building board which comprises forming a paste-like mixture of the following ingredients in substantially the percentages by weight stated, namely, 60.5% of finely comminuted limestone, 33.3% of sodium silicate, and 6.2% of asphalt having a softening point ranging from about 200° to 240° F., depositing said paste-like mixture in a layer between two liners of waterproofed material, and heating the composite structure to a temperature of about 300° F. to cause the paste-like mixture to intumesce and to adhere to the liners.

2. The method of making a laminated building board which comprises intimately mixing about 6% by weight each of finely comminuted asphalt and a mineral filler, adding to said mixture about 54% by weight of like mineral filler and about 33% by weight of sodium silicate to form a smooth mixture of paste-like consistency, applying the mixture in a core layer of substantially uniform thickness between two liners, and heating the composite structure to cause the core layer to intumesce and adhere to the liners.

BRAXTON E. GALLUP.

REFERENCES CITED

The following references are of record in the file of this patent:

UNITED STATES PATENTS

| Number | Name | Date |
| --- | --- | --- |
| 1,171,236 | Paterson | Feb. 8, 1916 |
| 1,344,324 | Walter | June 22, 1920 |
| 1,491,112 | Spink | Apr. 22, 1924 |
| 1,655,718 | Weiss et al. | Jan. 10, 1928 |
| 1,738,906 | Kirschbraun | Dec. 10, 1929 |
| 1,744,378 | Fischer | Jan. 21, 1930 |
| 1,847,366 | Spencer | Mar. 1, 1932 |
| 1,874,674 | Watson | Aug. 30, 1932 |
| 1,977,669 | Dantz | Oct. 23, 1934 |
| 2,035,122 | Fulton et al. | Mar. 24, 1936 |
| 2,047,016 | Elias | July 7, 1936 |

FOREIGN PATENTS

| Number | Country | Date |
| --- | --- | --- |
| 776,920 | France | Nov. 17, 1934 |